(12) United States Patent
Fatemi et al.

(10) Patent No.: US 11,722,043 B2
(45) Date of Patent: Aug. 8, 2023

(54) SYNCHRONOUS MACHINE HAVING HYBRID ROTOR EXCITATION

(71) Applicant: GM Global Technology Operations LLC, Detroit, MI (US)

(72) Inventors: Alireza Fatemi, Canton, MI (US); Shawn H. Swales, Canton, MI (US); Mohammad F. Momen, Rochester Hills, MI (US); Derek F. Lahr, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 296 days.

(21) Appl. No.: 17/038,757

(22) Filed: Sep. 30, 2020

(65) Prior Publication Data

US 2022/0103049 A1    Mar. 31, 2022

(51) Int. Cl.
*H02K 21/04*      (2006.01)
*H02K 1/276*      (2022.01)
*H02K 21/14*      (2006.01)
*H02K 1/2706*     (2022.01)

(52) U.S. Cl.
CPC ......... *H02K 21/042* (2013.01); *H02K 1/2706* (2013.01); *H02K 1/2766* (2013.01); *H02K 21/046* (2013.01); *H02K 21/14* (2013.01)

(58) Field of Classification Search
CPC .................................................. H02K 21/042
See application file for complete search history.

(56) References Cited

FOREIGN PATENT DOCUMENTS

JP      2009142120 A   *   6/2009

* cited by examiner

*Primary Examiner* — Ramon M Barrera
(74) *Attorney, Agent, or Firm* — Vivacqua Crane, PLLC (57) ABSTRACT

A synchronous machine having a hybrid rotor excitation. The synchronous machine includes a rotor having a plurality of permanent magnets and electromagnets embedded within a rotor body. The permanent magnets produces a constant magnet field having a magnetic axis along a direct axis (D-axis). The electromagnets produces a variable magnetic field along a magnetic axis offset from the D-axis, preferable substantially orthogonal to the D-axis. The plurality of permanent magnets are separated from the electromagnets by a rotor air-gap. The plurality of permanent magnets includes inner pairs and outer pairs of permanent magnets nested in a V-shaped configuration. In another embodiment, the outer pairs of permanent magnets are replaced with outer radius electromagnets.

20 Claims, 5 Drawing Sheets

SYNCHRONOUS MACHINE HAVING HYBRID ROTOR EXCITATION

The present disclosure relates to electric machines, more particularly to a synchronous electric motor having a hybrid rotor excitation.

In an electric motor, an electric current is conveyed through windings in the stator to generate a moving magnetic field that interacts with a rotor disposed within the stator to generate a torque that turns the rotor. Electric motors may be classified as induction electric motors or synchronous electric motors. Synchronous motors are more desirable, as compared to induction motors, for motor vehicle operations because its higher torque output, controllability of rotational speed, and efficiency.

In a synchronous electric motor, the rotor typically uses permanent magnets to produce a constant magnetic field (CMF) that interacts with a rotating magnetic field (RMF) generated by a three-phase alternating current (AC) supplied to a field coil of the stator. Alternative to using permanent magnets, the rotor may use coil windings that act as permanent magnets when excited by a direct current (DC). The opposite poles of the CMF and RMF attract and lock upon each other causing the rotor to rotate at the same rate of rotation as that of the RMF, also referred to as synchronous speed with the RMF. The speed of the rotor may be controlled by varying the frequency of the 3-phase current.

The permanent magnets used in the rotor are usually formed of expensive rare earth materials in order for the permanent magnets to have a sufficient magnetic field to maintain engagement with the RMF. As the rotation of the rotor increase in speed, the magnetic attraction between the CMF of the permanent magnet and RMF of the stator may weaken resulting in reduced performance and higher loss. Rotors having coil windings can generate a variable magnetic field to maintain performance at higher speeds as compared to permanent magnets and are lower cost than rare earth permanent magnets. However, over time coil windings can suffer copper losses which reduces the low-speed efficiency of the motor and initial start-up.

Thus, while current synchronous electric motors achieve their intended purpose, there is a need for an improved synchronous electric motor having improved efficiency at low speed high speed operations, as well as controllability and low cost of material.

SUMMARY

According to several aspects, an electric machine is disclosed. The electric machine includes a stator configured to generate a rotating magnetic field when energize; a rotor having a rotor body and a plurality of permanent magnets and a plurality of excitable electromagnets embedded within the rotor body. At least one of permanent magnets produces a constant magnet field having a magnetic axis along a direct axis (D-axis). At least one of the plurality of excitable electromagnets, when excited, produces a variable magnetic field along a magnetic axis offset from the D-axis.

In an additional aspect of the present disclosure, the at least one of the plurality of excitable electromagnets, when excited, produces a variable magnetic field along a magnetic axis substantially orthogonal to the D-axis In another aspect of the present disclosure, the plurality of permanent magnets includes an inner pair of permanent magnets arranged in a V-shape configuration separated from the electromagnets by a rotor air-gap.

In another aspect of the present disclosure, the plurality of permanent magnets includes an outer pair of permanent magnets arranged in a V-shape configuration disposed between the inner pair of permanent magnets and the outer surface of the rotor.

In another aspect of the present disclosure, the V-shape configuration of the inner and outer pairs of permanent magnets include a narrow end oriented toward the inner surface of the rotor and a wide end oriented toward the outer surface of the rotor.

In another aspect of the present disclosure, the plurality of electromagnets includes an inner radius electromagnet disposed between the inner surface of the rotor and the inner pair of permanent magnets, wherein the inner radius electromagnet is separated from the inner pair of permanent magnets by the rotor air-gap.

In another aspect of the present disclosure, the plurality of electromagnets includes an outer radius electromagnet disposed between the inner pair of permanent magnets and the outer surface of the rotor.

In another aspect of the present disclosure, the electromagnet is embedded in the rotor adjacent the inner surface of the rotor; and the plurality of permanent magnets includes an outer pair of permanent magnets embedded in the rotor adjacent the outer surface of the rotor and an inner pair of permanent magnets embedded in the rotor between the electromagnet and outer pair of permanent magnets.

In another aspect of the present disclosure, the rotor includes a rotor body having a first component defining a bobbin interlocked to a second component, wherein the plurality of electromagnets are defined by a plurality of coil windings wrapped onto the bobbin.

In another aspect of the present disclosure, the outer pair of permanent magnets is nested within the inner pair of permanent magnets in a V-shape configuration within the second component.

In another aspect of the present disclosure, plurality of excitable electromagnets, when excited, cooperates with the plurality of permanent magnets to produce a torque represented by the equation:

$$\text{Torque} = 3P/4 \varphi_{PM} i_q + (L_d - L_q) i_d i_q - L_j i_j i_d$$

where: P is the number of magnetic poles and $-L_j i_j i_d$ represents the added torque component a three-phase machine 100.

According to several aspects, a rotor for an electric machine is disclosed. The rotor includes an outer surface, an opposite inner surface, and a rotor body defined between the outer and inner surface; a plurality of permanent magnets embedded within the rotor body, wherein at least one of the plurality of permanent magnets produces a constant magnet field having a magnetic axis along a direct axis (D-axis); and a plurality of excitable electromagnets embedded within the rotor body, wherein at least one of the plurality of electromagnets, when excited, produces a variable magnetic field along a magnetic axis offset from the D-axis.

In an additional aspect of the present disclosure, the at least one of the plurality of excitable electromagnets, when excited, produces a variable magnetic field along a quadrature (Q-axis) of the at least one of the plurality of permanent magnets.

In another aspect of the present disclosure, the rotor body comprises of a first rotor component and a second rotor component configured to engage and inlock onto the first rotor component.

In another aspect of the present disclosure, the first rotor component comprises one of a bobbin configured receive an electrical conductive winding and a slot configured to receive an electrical conductive bar.

In another aspect of the present disclosure, the second rotor component defines a plurality of V-shape channels configured to receive a plurality of permanent magnet bars.

According to several aspects, a synchronous machine having a hybrid rotor excitation is disclosed. The synchronous machine includes a stator configured to generate a rotating magnetic field when energized, wherein the stator includes an interior surface defining a rotor cavity; a rotor having an outer surface, an opposite inner surface, and a rotor body defined between the outer and inner surface; a plurality of permanent magnets embedded within the rotor body proximal to the outer surface, wherein at least one of the plurality of permanent magnets produces a constant magnet field having a magnetic axis along a direct axis (D-axis); and a plurality of excitable electromagnets embedded within the rotor body proximal to the inner surface, wherein at least one of the plurality of electromagnets, when excited, produces a variable magnetic field along a magnetic axis offset from the D-axis.

In an additional aspect of the present disclosure, the electromagnet include an inner radius electromagnet disposed in the rotor body adjacent the inner surface; and the plurality of permanent magnets includes an inner pair of permanent magnets disposed in the rotor body adjacent the electromagnet, wherein the permanent magnet is spaced from the electromagnet by a rotor-air gap.

In another aspect of the present disclosure, the plurality of permanent magnets further includes an outer pair of permanent magnets disposed in the rotor body adjacent the outer surface of the rotor.

In another aspect of the present disclosure, the outer pair of permanent magnets are nested in the inner pair of permanent magnets in a V-shaped configuration.

In another aspect of the present disclosure, the electromagnet further includes an outer radius electromagnet disposed in the rotor body between the inner pair of permanent magnets and the outer surface of the rotor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
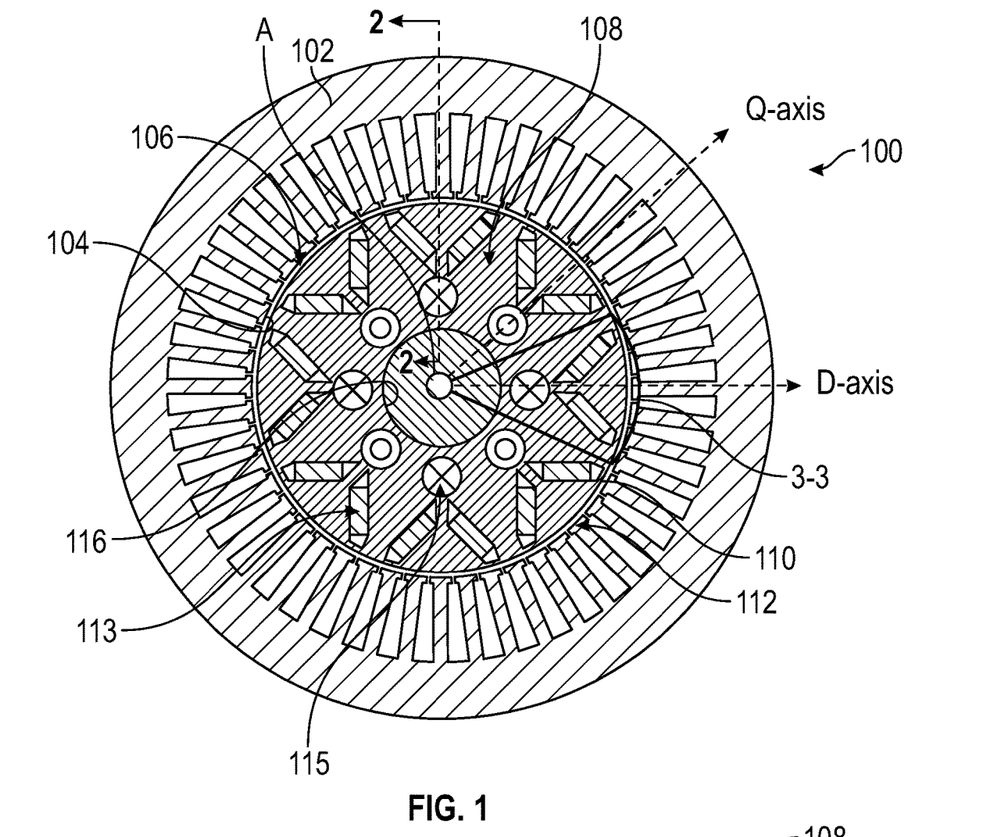
FIG. 1 is a schematic cross-sectional end view of an electric synchronous machine having a hybrid rotor excitation, according to an exemplary embodiment.

Referring to FIG. 1, is a schematic cross-sectional view of an electric machine 100, more particularly to an electric synchronous motor 100 having a hybrid rotor excitation. The electric machine 100 includes a stator 102 having a plurality of coiled windings configured to generate a rotating magnetic field when energized with a power source, such as a three-phase electric power. The stator 102 includes an interior surface 104 defining a rotor cavity 106. A rotor 108, rotatable about a rotational axis (A-axis), is disposed within the rotor cavity 106 of the stator 102. The rotor 108 includes an outer surface 110 spaced from the interior surface 104 of the stator 102 to define an annular air-gap 112 therebetween the rotor 108 and stator 102. Multiple magnetic field sources including permanent magnets 113 and electromagnets 115 are embedded within the rotor 108. The electromagnets 115 selectively generate a variable magnetic field that is substantially orthogonal to a constant magnetic field produced by the permanent magnets, details and benefits of which are further disclosed below.

Figure 2:
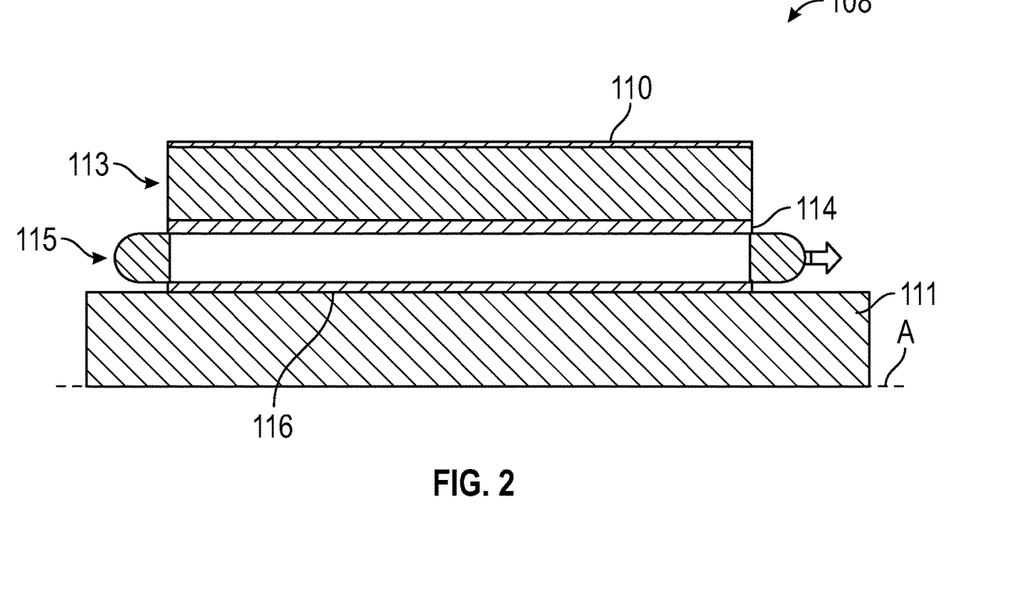
FIG. 2 is a schematic cross-sectional side view of a rotor of the electric synchronous machine of FIG. 1, according to an exemplary embodiment.

FIG. 2 shows a schematic longitudinal cross-sectional side view of the electric machine 100. Referring to both FIGS. 1 and 2, the rotor 108 is formed of a plurality of iron core plates laminated in an axial direction along the A-axis to define a rotor body 114 between the outer surface 110 of the rotor 108 and an inner surface 116 of the rotor 108. The inner surface 116 is rotationally fixed to a rotatable shaft 111 such that the rotor 108 rotates with the shaft 111 in a 1:1 ratio. In the embodiment shown, the permanent magnets 113 are embedded within the rotor body 114 adjacent to the outer surface 110 of the rotor 108. The electromagnets 115 are also embedded within the rotor body 114, but adjacent to the inner surface 116 of the rotor 108.

Figure 3:
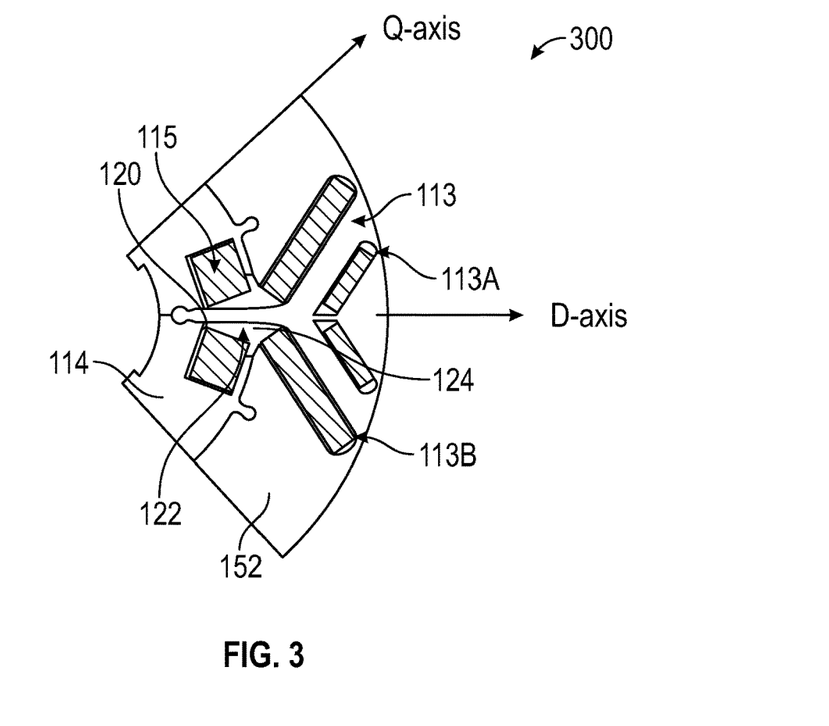
FIG. 3 is a detailed schematic cross-sectional view of a rotor portion 3-3 of FIG. 1, according to an exemplary embodiment.

Referring to FIG. 3 is a detailed view of a portion 3-3 of the rotor 108 shown in FIG. 1. The rotor body 114 includes an interior surface 120 defining a rotor body cavity 122 for receiving a plurality of groups of permanent magnets 113 and electromagnets 115 such that the groups of permanent magnets 113 are spaced from the electromagnets 115 and separated by an air-gap 124. The rotor body 114 may be formed of multiple interlocking rotor components 150, 152. The first rotor component 150 is a bobbin having plurality of coil windings defining the electromagnets 115 and the second rotor component 152 defines a plurality of V-shaped channels configured to receive bars of permanent magnets 113, also referred to as permanent magnet bars 113. The first and second rotor components 150, 152 may be formed of a stacked laminates of iron core plates. The rotor components 150, 152 include means to interlock onto each other to form a complete rotor body 114.

In the embodiment shown, referring to FIGS. 1-3, the groups of permanent magnets 113 are equally circumferentially spaced proximal to the outer surface 110 of the rotor 108 and arranged such the polarity of the groups of permanent magnets 113 are alternatively inverted. Each group of permanent magnets 113 includes an outer pair of permanent magnets 113A and an inner pair of permanent magnets 113B, wherein the inner pair of permanent magnets 113B are immediately adjacent to the electromagnets 115. Each pair of permanent magnets 113A, 113B are arranged in a V-shape configuration, in which the narrow end of the V-shape is oriented toward the rotational A-axis and the wide end of the V-shape is oriented toward the stator 102.

Figure 4:
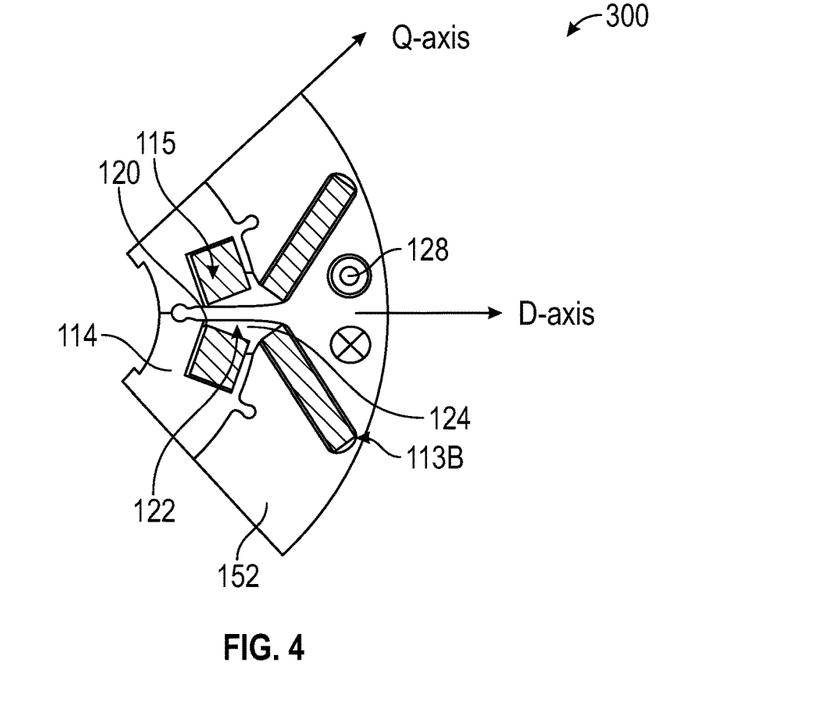
FIG. 4 is a detailed schematic cross-sectional view of an alternative embodiment of the portion of the rotor portion 4-4 of FIG. 1.

In the exemplary embodiment, the outer pair of permanent magnets 113A are smaller in size and hence produces a weaker constant magnetic field than the inner pair of the permanent magnet 113B. In another embodiment, which is shown in FIG. 4 and disclosed in detail below, the outer pair of permanent magnet 113A may be substituted with an outer radius electromagnets 128 to provide a variable magnetic field. The outer pair of permanent magnets 113A are in nested configuration with the inner pair of permanent magnets 113B. Each group of permanent magnets 113A, 113B produces a magnetic field having a magnetic axis extending along a direct axis (D-axis) bisecting the nested V-shape orientation of the nested pairs of permanent magnets 113A, 113B. In the embodiment shown, the rotor 108 includes an eight pole permanent magnet rotor 108.

Figure 9:
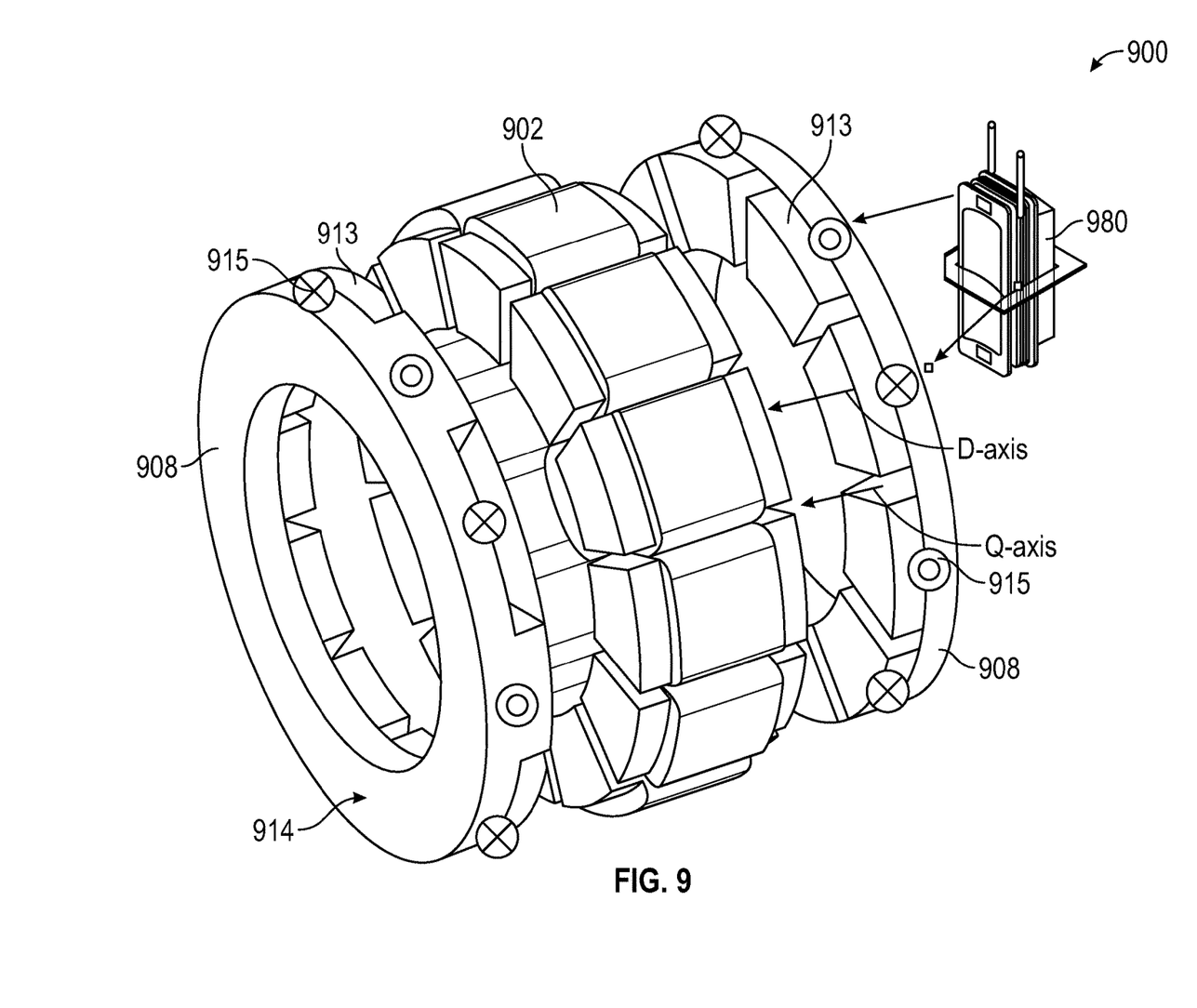
FIG. 9 is an embodiment of an axial-flux electric synchronous machine having a hybrid rotor excitation

The electromagnets 115 are formed of a plurality of coil windings or electric current conductible bars inserted axially into the rotor cavity 106 adjacent the plurality of permanent magnets 113. The coil windings or electrically conductive bars are electrically connected to a direct current power supply through slip rings in contact with electric brush assemblies (not shown) or via a wireless power supply 980 (an example of which is shown in FIG. 9) such as a rotary transformer for selectively energizing the electromagnets. Current flows in from one side of the winding and current flows out from the other side of the winding. Referring to FIG. 1, "X" shown at an end of a winding or conductive bar represents current inflow, and "O" represents current outflow. In the embodiment shown, the rotor 108 includes an eight pole electromagnet rotor 108.

Still referring to FIG. 3, the strength of the magnetic field generated by the electromagnets are controlled by the amount of direct current flowing in the windings or conductive bars. When energized, the electromagnets generate a magnetic field having a magnetic axis extending radially substantially along the quadrature (Q-axis) of the permanent magnets 113. However, the magnetic axis generated by the permanent magnets 113 defines the D-axis of the magnetic circuit. A benefit is that the two fields are not being fully aligned thus allowing reduction of the magnetic reluctance in the path of the magnetic field generated by the electromagnets, which would reduce the losses in the field winding and simplifies the excitation circuit.

FIG. 4 shows an alternative embodiment of the rotor 108 in which the outer pair of permanent magnets 113A adjacent to the outer surface 110 of the rotor 108 are replaced with outer radius electromagnets 128. The outer radius electromagnets 128 are formed of a plurality of coil windings or electric current conductible bars inserted axially into the rotor cavity 106. The outer radius electromagnets 128 have an inverted direct current flow as compared to that of the corresponding electromagnets 115. In the exemplary embodiment shown, the inner pairs of permanent magnets 113B produces a magnetic axis in the D-axis, the outer radius electromagnets 128 produces a second magnetic axis also in line with the D-axis, and the inner radius electromagnets 115 produces an magnetic axis in the Q-axis, substantially orthogonal with the D-axis. The amount of current may be varied through the inner and outer radius electromagnets 115, 128 to vary the strength of magnetic field generated by each, respectively.

Figure 5:
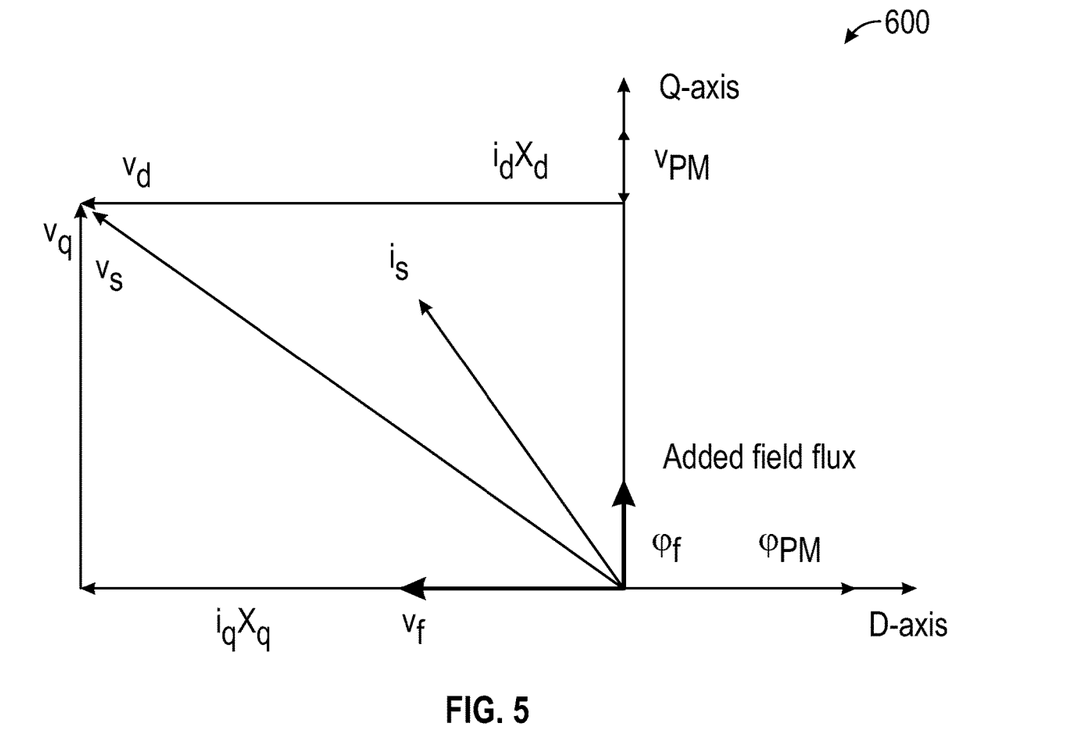
FIG. 5 is a phasor diagram of the electric synchronous machine of FIG. 1.
Figure 6:
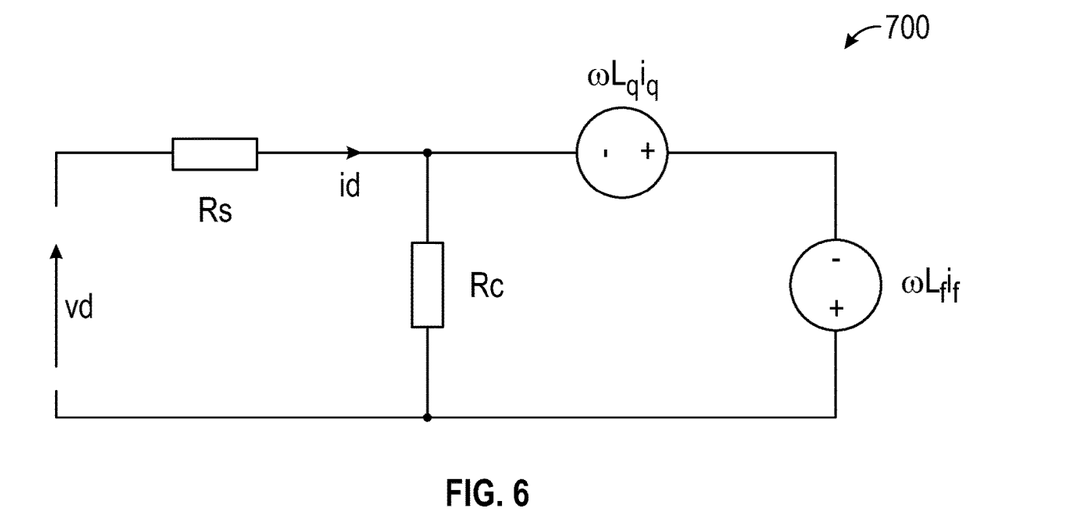
FIG. 6 is a D-axis equivalent circuit of the electric synchronous machine of FIG. 1.
Figure 7:
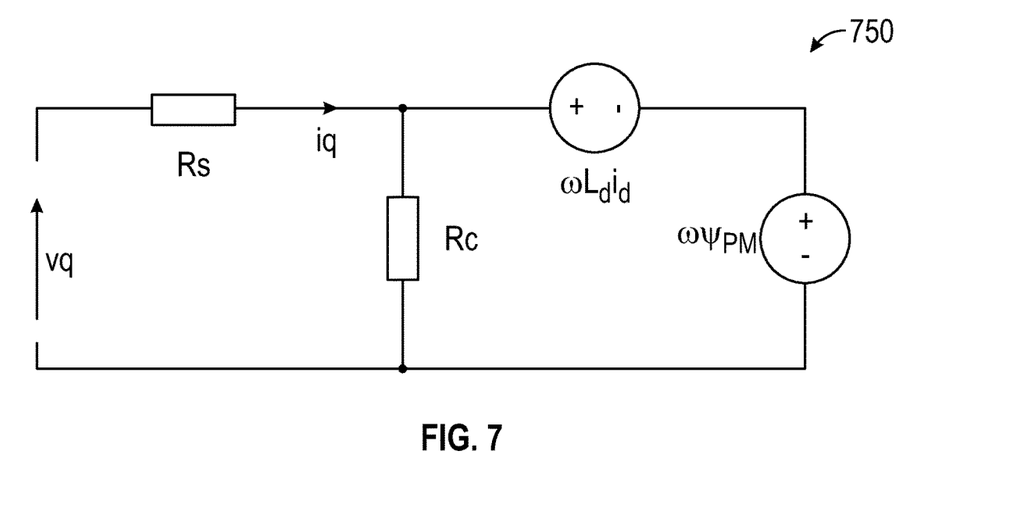
FIG. 7 is a Q-axis equivalent circuit of the electric synchronous machine of FIG. 1.

FIG. 5 shows a phasor diagram, also referred to as a vector diagram 600, of the electric synchronous machine 100 of FIG. 1. In this exemplary embodiment, the winding magnetic axis is electrically perpendicular to the D-axis. FIG. 6 is a D-axis equivalent circuit, also referred to as circuit 700, of the electric synchronous machine 100 of FIG. 1. FIG. 7 is a Q-axis equivalent circuit, also referred to circuit 750, of the electric synchronous machine 100 of FIG. 1. The operation of the permanent magnet synchronous machine 100 is described with reference to the vector diagram 600, D-axis equivalent circuit 700, and Q-axis equivalent circuit, where:

$v_d$=D-axis voltage (volts);
$v_q$=Q-axis voltages (volts);
$i_d$=D-axis currents (amps);
$i_q$=Q-axis currents (amps);
$i_s$=current vectors (amps);
$v_s$=voltage vectors (volts);
$X_d$=D-axis reactance (ohms);
$X_q$=Q-axis reactance (ohms);
$\psi_{pm}$=permanent magnet flux linkage (weber-turns);
$\psi_f$=field winding flux linkages in (weber-turns);
$v_f$=voltage induced as a result of the $\psi\_f$ (volts) when the field current in amps;
$L_d$=D-axis inductance (Henry);
$L_q$=Q-axis inductance (Henry);
$R_c$=stator wining resistance (ohms);
$R_c$=core loss modeling resistance (ohms); and
ω=electrical synchronous speed (radian per second)

In one embodiment, where the magnetic axis of the auxiliary field winding is aligned with the positive q-axis, the flux linkage of the field winding, $\psi_f$, and the resultant voltage induced in the stator 102 winding, $v_f = \psi L i_f$, are introduced to the vector diagram and the associated circuit models, as shown in the figures.

As shown in FIG. 5, the interaction of $\psi_f$ with the stator 102 current $i_s$ would result in a net torque of ($-L_f i_f i_d$), where $i_d$ is the d-component of the stator 102 current excitation. Furthermore, the induced voltage, $v_f$, which appears in circuit 700 and circuit 750 provides an additional degree of freedom for controlling the induced voltage in the machine 100. The sum of the torque generated by the electric machine 100 is represented by the equation:

$$\text{Torque} = 3P/4\varphi_{PM}i_q + (L_d - L_q)i_d i_q - L_f i_f i_d$$

where: P is the number of magnetic poles and $-L_f i_f i_d$ represents the added torque component a three-phase machine 100.

The maximum torque per amp (MTPA) occurs at a larger torque angle. Output torque is non-zero even when current angle is 90 degrees. Therefore, the disclosed configuration of the electric machine 100 provides additional control over torque and terminal voltages when compared to a machine 100 having either permanent magnets 113 or electromagnets 115. Since the winding field is impressed on the low-reluctance path substantially in the Q-axis, the excitation power and losses required for generating flux and torque is lower than those of the methods.

The above disclosed rotor configuration having a plurality of permanent magnets and a plurality of excitable electromagnets embedded within the rotor body, in which at least one the permanent magnets produces a constant magnet field having a magnetic axis along a direct axis (D-axis) and at least one of the plurality of excitable electromagnets, when excited, produces a variable magnetic field having a magnetic axis offset from the D-axis, is not limited to applications in electric machines having an internal rotor, also known as inner-rotor machines. The above disclosed rotor configuration is also applicable to other types of electric machines such as an outer rotor electric machine and an axial flux electric machine.

Figure 8:
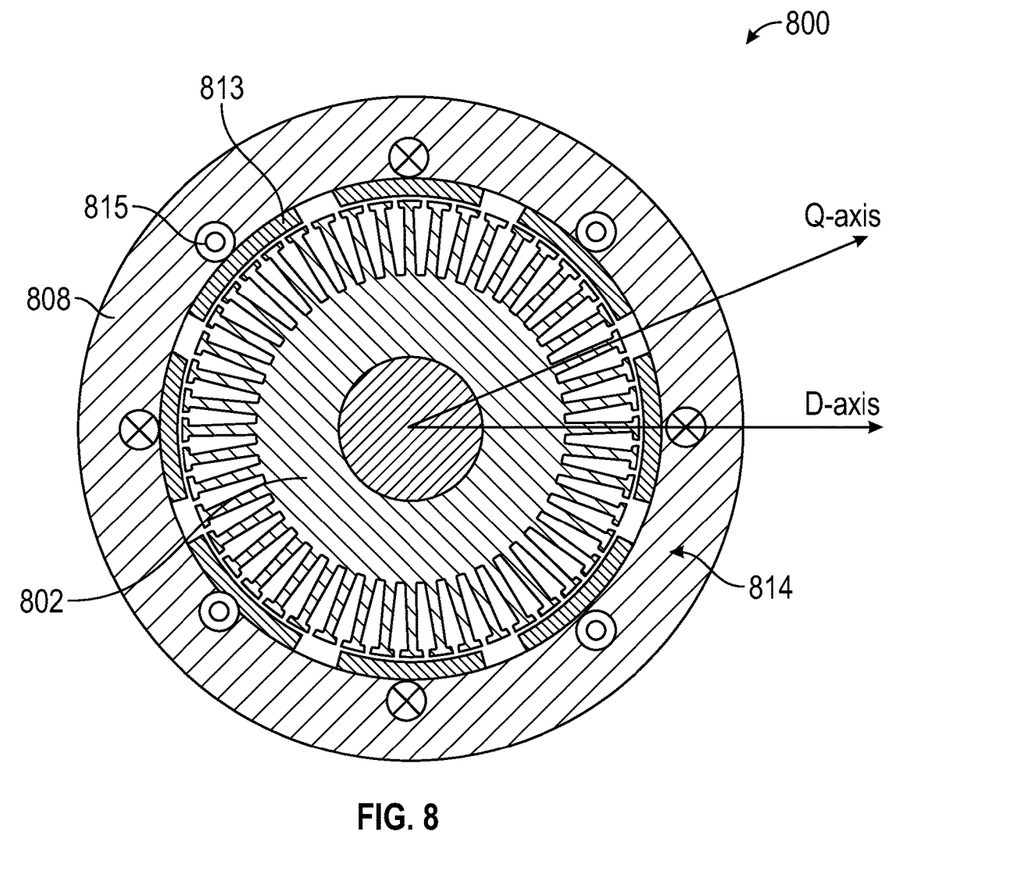
FIG. 8 is an embodiment of an outer rotor electric synchronous machine having a hybrid rotor excitation.

Shown in FIG. 8 is an example of an outer-rotor electric machine 800 having a stator 802 disposed within a rotor 808. The rotor 808 includes a plurality of permanent magnets 813 and a plurality of excitable electromagnets 815 embedded within the rotor body 814, in which at least one the permanent magnets 813 produces a constant magnet field having a magnetic axis along a direct axis (D-axis) and at least one of the plurality of excitable electromagnets 815, when excited, produces a variable magnetic field having a magnetic axis offset from the D-axis.

Shown in FIG. 9 is an example of an axial flux electric machine 800 having a stator 902 disposed between two external rotors 908. At least one of the rotor 908 includes a plurality of permanent magnets 913 and a plurality of excitable electromagnets 915 embedded within the rotor body 914, in which at least one the permanent magnets 913 produces a constant magnet field having a magnetic axis along a direct axis (D-axis) and at least one of the plurality of excitable electromagnets 915, when excited, produces a variable magnetic field having a magnetic axis offset from the D-axis.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An electric machine, comprising:
    a rotor having an outer surface, an inner surface opposite of the outer surface, and a rotor body defined between the outer surface and the inner surface;
    a plurality of permanent magnets embedded within the rotor body, wherein at least one of the plurality of permanent magnets produces a constant magnet field having a magnetic axis along a direct axis (D-axis); and
    a plurality of excitable electromagnets embedded within the rotor body, wherein at least one of the plurality of excitable electromagnets, when excited, produces a variable magnetic field having a magnetic axis offset from the D-axis; and
    wherein the plurality of permanent magnets includes an inner pair of permanent magnets arranged in a V-shape configuration and spaced from one of the plurality of excitable electromagnets by a rotor air-gap.

2. The electric machine of claim 1, wherein the magnetic axis of the variable magnetic field is substantially orthogonal to the D-axis.

3. The electric machine of claim 2, wherein plurality of excitable electromagnets, when excited, cooperates with the plurality of permanent magnets to produce a torque represented by equation:

$$\text{Torque} = 3P/4\varphi_{PM}i_q + (L_d - L_q)i_d i_q - L_j i_j i_d$$

where:
P=a number of magnetic poles;
$i_d$=D-axis currents (amps);
$i_q$=Q-axis currents (amps);
$\psi_{pm}$=permanent magnet flux linkage (weber-turns);
$L_d$=D-axis inductance (Henry);
$L_q$=Q-axis inductance (Henry); and
$-L_j i_j i_d$ represents an added torque component for a three-phase machine.

4. The electric machine of claim 1, wherein the plurality of permanent magnets includes an outer pair of permanent magnets arranged in a V-shape configuration disposed between the inner pair of permanent magnets and the outer surface of the rotor.

5. The electric machine of claim 4, wherein the V-shape configuration of the inner pair of permanent magnets and the outer pair of permanent magnets include a narrow end oriented toward the inner surface of the rotor and a wide end oriented toward the outer surface of the rotor.

6. The electric machine of claim 1, wherein the plurality of excitable electromagnets includes an inner radius electromagnet disposed between the inner surface of the rotor and the inner pair of permanent magnets, wherein the inner radius electromagnet is separated from the inner pair of permanent magnets by the rotor air-gap.

7. The electric machine of claim 6, wherein the plurality of excitable electromagnets includes an outer radius electromagnet disposed between the inner pair of permanent magnets and the outer surface of the rotor.

8. The electric machine of claim 1, wherein:
    the plurality of excitable electromagnet is embedded in the rotor body adjacent an inner surface of the rotor; and
    the plurality of permanent magnets includes an outer pair of permanent magnets embedded in the rotor body adjacent the outer surface of the rotor and the inner pair of permanent magnets embedded in the rotor body between the plurality of excitable electromagnet and outer pair of permanent magnets.

9. The electric machine of claim 8, wherein the rotor body having a first component defining a bobbin interlocked to a second component, wherein the plurality of excitable electromagnets are defined by a plurality of coil windings wrapped onto the bobbin.

10. The electric machine of claim 1, wherein the rotor body comprises of a first rotor component and a second rotor component configured to engage and inlock onto the first rotor component.

11. The electric machine of claim 10, wherein the first rotor component defines a slot configured to receive an electrically conductive bar.

12. A rotor for an electric machine, comprising:
    an outer surface, an opposite inner surface, and a rotor body defined between the outer surface and the inner surface;
    a plurality of permanent magnets embedded within the rotor body, wherein at least one of the plurality of permanent magnets produces a constant magnet field having a magnetic axis along a direct axis (D-axis); and
    a plurality of excitable electromagnets embedded within the rotor body, wherein at least one of the plurality of excitable electromagnets, when excited, produces a variable magnetic field having a magnetic axis offset from the D-axis;

wherein the at least one of the plurality of excitable electromagnets, when excited, produces a variable magnetic field along a quadrature (Q-axis) of the at least one of the plurality of permanent magnets;

wherein the rotor body comprises of a first rotor component and a second rotor component configured to engage and inlock onto the first rotor component; and wherein the first rotor component defines a slot configured to receive an electrical conductive bar or comprises a bobbin configured to receive an electrical conductive winding.

13. The rotor of claim 12, wherein the second rotor component defines a plurality of V-shape channels configured to receive a plurality of permanent magnet bars.

14. The rotor of claim 12, wherein the Q-axis is substantially orthogonal with the D-axis.

15. The rotor of claim 14, wherein the electric machine is a synchronous machine.

16. The rotor of claim 15, wherein the plurality of excitable electromagnets, when excited, cooperates with the plurality of permanent magnets to produce a torque represented by equation:

$$\text{Torque}=3P/4\varphi_{PM}i_q+(L_d-L_q)i_di_q-L_fi_fi_d$$

where:

P=a number of magnetic poles;
$i_d$=D-axis currents (amps);
$i_q$=Q-axis currents (amps);
$\psi_{pm}$=permanent magnet flux linkage (weber-turns);
$L_d$=D-axis inductance (Henry);
$L_q$=Q-axis inductance (Henry); and
$-L_fi_fi_d$ represents an added torque component for a three-phase machine.

17. A synchronous machine having a hybrid rotor excitation, comprising:

a stator configured to generate a rotating magnetic field when energized, wherein the stator includes an interior surface defining a rotor cavity;

a rotor having an outer surface, an opposite inner surface, and a rotor body defined between the outer surface and the inner surface;

a plurality of permanent magnets embedded within the rotor body proximal to the outer surface, wherein at least one of the plurality of permanent magnets produces a constant magnet field having a magnetic axis along a direct axis (D-axis); and a plurality of excitable electromagnets embedded within the rotor body proximal to the inner surface, wherein at least one of the plurality of excitable electromagnets, when excited, produces a variable magnetic field along a magnetic axis offset from the D-axis; and wherein:

the plurality of excitable electromagnets include an inner radius electromagnet disposed in the rotor body adjacent the inner surface; and the plurality of permanent magnets includes an inner pair of permanent magnets disposed in the rotor body adjacent the inner radius electromagnet, wherein the inner pair of permanent magnet is spaced from the inner radius electromagnet by a rotor-air gap.

18. The synchronous machine of claim 17, wherein the plurality of permanent magnets further includes an outer pair of permanent magnets disposed in the rotor body adjacent the outer surface of the rotor.

19. The synchronous machine of claim 18, wherein the outer pair of permanent magnets are nested in the inner pair of permanent magnets in a V-shaped configuration.

20. The synchronous machine of claim 17, wherein the plurality of excitable electromagnets further includes an outer radius electromagnet disposed in the rotor body between the inner pair of permanent magnets and the outer surface of the rotor.

* * * * *